(12) United States Patent
Iguchi et al.

(10) Patent No.: US 11,823,840 B2
(45) Date of Patent: Nov. 21, 2023

(54) CERAMIC ELECTRONIC DEVICE

(71) Applicant: TDK CORPORATION, Tokyo (JP)

(72) Inventors: Toshihiro Iguchi, Tokyo (JP); Yuichiro Sueda, Tokyo (JP); Ryota Namiki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 18 days.

(21) Appl. No.: 17/683,518

(22) Filed: Mar. 1, 2022

(65) Prior Publication Data
US 2022/0285096 A1 Sep. 8, 2022

(30) Foreign Application Priority Data

Mar. 8, 2021 (JP) ................. 2021-036609

(51) Int. Cl.
*H01G 4/232* (2006.01)
*H01G 4/12* (2006.01)
*H01G 4/30* (2006.01)

(52) U.S. Cl.
CPC ......... *H01G 4/2325* (2013.01); *H01G 4/1227* (2013.01); *H01G 4/30* (2013.01)

(58) Field of Classification Search
CPC ....... H01G 4/2325; H01G 4/1227; H01G 4/30
See application file for complete search history.

(56) References Cited

U.S. PATENT DOCUMENTS

| | | | | |
|---|---|---|---|---|
| 2002/0046861 A1* | 4/2002 | Yokoyama | ............. | H01G 4/232 174/565 |
| 2008/0013252 A1* | 1/2008 | Nakano | .................. | H01G 4/30 361/311 |
| 2009/0323253 A1* | 12/2009 | Kobayashi | ............. | H01G 4/005 427/79 |
| 2013/0100579 A1* | 4/2013 | Morito | .................. | H01G 4/224 361/321.2 |
| 2014/0347783 A1* | 11/2014 | Kisumi | ................ | H01G 4/0085 427/79 |
| 2015/0016018 A1* | 1/2015 | Onishi | ................. | H10N 30/872 310/365 |
| 2015/0318111 A1* | 11/2015 | Lee | ....................... | H01G 4/2325 29/25.03 |
| 2016/0268046 A1* | 9/2016 | Nishisaka | ............... | H01G 4/232 |
| 2016/0293331 A1* | 10/2016 | Kitamura | ................. | H01G 4/12 |
| 2017/0018358 A1* | 1/2017 | Isota | ........................ | H01G 4/30 |
| 2017/0018362 A1* | 1/2017 | Nishisaka | ................ | H01G 4/30 |

FOREIGN PATENT DOCUMENTS

JP H04-171912 A 6/1992

* cited by examiner

*Primary Examiner* — Michael P McFadden
(74) *Attorney, Agent, or Firm* — Oliff PLC

(57) ABSTRACT

A ceramic electronic device includes an element body and an external electrode. The element body is formed by laminating a ceramic layer and an internal electrode layer. The external electrode is electrically connected to at least one end of the internal electrode layer. At least a part of a joint boundary between the electrode layer and the ceramic layer includes an interface protrusion on the external electrode side. The interface protrusion is made of an oxide.

10 Claims, 8 Drawing Sheets

CERAMIC ELECTRONIC DEVICE

BACKGROUND OF THE INVENTION

The present invention relates to a ceramic electronic device including an external electrode.

As shown in Patent Document 1, a ceramic electronic device including an element body containing a ceramic component and external electrodes formed on an outer surface of the element body is known. Baked electrodes are widely used as external electrodes for ceramic electronic devices, and the baked electrodes can be formed by applying a conductive paste containing conductor powder and glass frit to the surface of the element body and baking it.

In the conventional technique as shown in Patent Document 1, however, it is difficult to bond an external electrode containing an element having a low ionization tendency, such as copper, as a conductor to an element body or a glass frit, which is an oxide.

Patent Document 1: JPH04171912 (A)

BRIEF SUMMARY OF THE INVENTION

The present invention has been achieved under such circumstances. It is an object of the present invention to provide a ceramic electronic device having a high joint reliability between an element body and an external electrode.

To achieve the above object, a ceramic electronic device according to the present invention comprises:

an element body formed by laminating a ceramic layer and an internal electrode layer; and an external electrode electrically connected to at least one end of the internal electrode layer, wherein at least a part of a joint boundary between the external electrode and the ceramic layer includes an interface protrusion protruding toward the external electrode, and the interface protrusion comprises an oxide.

The multilayer ceramic capacitor according to the present invention can enhance the joint reliability between the element body and the external electrode. The reason is considered as below.

In the present invention, at least a part of a joint boundary between the external electrode and the ceramic layer includes an interface protrusion protruding toward the external electrode. In addition, the interface protrusion comprises an oxide. Thus, the interface protrusion contained in the external electrode is easily jointed with the element body including the ceramic layer (oxide), and the element body and the external electrode can consequently firmly be jointed. Thus, the joint reliability can be high.

The joint reliability can be determined by, for example, a change rate in capacitance in an air-tank-type thermal shock test. That is, when a change rate ($C_\beta/C_\alpha$) in a capacitance $C_\beta$ after the test to a capacitance $C_\alpha$ before the test is high, the joint reliability can be considered to be high. The higher the joint strength is, the higher the joint reliability is.

The external electrode may include at least one of Cu, Cu alloys, Ag, and Ag alloys as a main component.

Copper and the like, which is used as a conductor for external electrodes, has a low ionization tendency and is thus comparatively difficult to oxidize. In other words, copper is a metal that is difficult to combine with oxygen. On the other hand, the ceramic component contained in the element body is an oxide. The glass frit contained in the external electrode is also an oxide. In the prior arts, it is thus difficult to bond an external electrode containing an element having a low ionization tendency, such as copper, as a conductor to an element body or a glass frit, which is an oxide.

On the other hand, the present invention can firmly join the element body and the external electrode by the interface protrusion even if the conductor of the external electrode contains an element that is difficult to oxidize, such as copper.

Preferably, the interface protrusion includes: a narrow part having a small width; and a wide part having a larger width than the narrow part and disposed next to the narrow part extending to the inner side of the external electrode from the narrow part.

This enables the interfacial protrusion to exhibit an anchor effect for the external electrode due to the constriction formed by the narrow part and the wide part and can thus further enhance the joint reliability between the element body and the external electrode.

Preferably, two or more interface protrusions each having a constriction formed by the narrow part and the wide part are present in a length of 100 μm of a joint boundary between the element body and the external electrode.

This makes it possible to more firmly join the element body and the external electrode.

Among the interface protrusions, $20° \leq \theta \leq 140°$ is preferably satisfied, where $\theta$ is an angle of the constriction having the smallest angle.

When the angle $\theta$ is within the above-mentioned range, as compared to when the angle $\theta$ is below the above-mentioned range, the external electrode easily enters the constriction the interface protrusion, and the anchor effect is further enhanced. When the angle $\theta$ is within the above-mentioned range, as compared to when the angle $\theta$ is above the above-mentioned range, the external electrode is easily sandwiched by the narrow part and the wide part of the interface protrusion and the anchor effect is further enhanced. Thus, when the angle $\theta$ is within the above-mentioned range, the anchor effect of the interface protrusion is further enhanced, and the element body and the external electrode are more firmly bonded to each other.

Preferably, Tw/Tn of the interface protrusion is 2 or more, where Tn is a width of the narrow part, and Tw is a width of the wide part.

When Tw/Tn is within the above-mentioned range, as compared to when Tw/Tn is below the above-mentioned range, the external electrode easily enters the constriction of the interface protrusion, the external electrode is easily sandwiched by the narrow part and the wide part of the interface protrusion and the anchor effect is further enhanced. Thus, when Tw/Tn is within the above-mentioned range, the anchor effect of the interface protrusion is further enhanced, and the element body and the external electrode are more firmly bonded to each other.

Preferably, at least a part of the oxide is glass.

When at least a part of the oxide constituting the interface protrusion is glass, the fluidity of the interface protrusion is enhanced. Thus, the interface protrusion can easily wet the conductor of the external electrode and the surface of the element body on the external electrode side. The glass contained in the interface protrusion is oxide and thus easily bonded with the element body including the ceramic layer (oxide). Thus, the element body and the external electrode can be joined more firmly.

Preferably, the interface protrusion includes at least two of B, Si, and Zn as main components.

As a result, the interface protrusion is easily vitrified, and the element body and the external electrode can be more firmly bonded to each other.

The ceramic layer may comprise a perovskite compound represented by $ABO_3$ as a main component.

The perovskite compound represented by $ABO_3$ may be represented by $(Ba_{1-a-b}Sr_aCa_b)_m(Ti_{1-c-d}Zr_cHf_d)O_3$ and satisfy $0.94<m<1.1$, $0≤a≤1$, $0≤b≤1$, $0≤c≤1$, and $0≤d≤1$.

Preferably, a magnitude correlation between $\alpha$, $\beta$, and $\delta$ satisfies $\beta>\alpha>\delta$, where $\alpha$ is a linear expansion coefficient of the ceramic layer, $\beta$ is a linear expansion coefficient of the external electrode, and $\delta$ is a linear expansion coefficient of the interface protrusion.

The interface protrusion has a low linear expansion coefficient. Since the interface protrusion is provided on the surface of the external electrode on the ceramic layer side, the components constituting the external electrode tighten the interface protrusion with thermal stress during cooling in the baking. This makes it possible to more firmly bond the element body and the external electrode.

BRIEF DESCRIPTION OF THE DRAWING(S)

DETAILED DESCRIPTION OF THE INVENTION

First Embodiment

Figure 1:
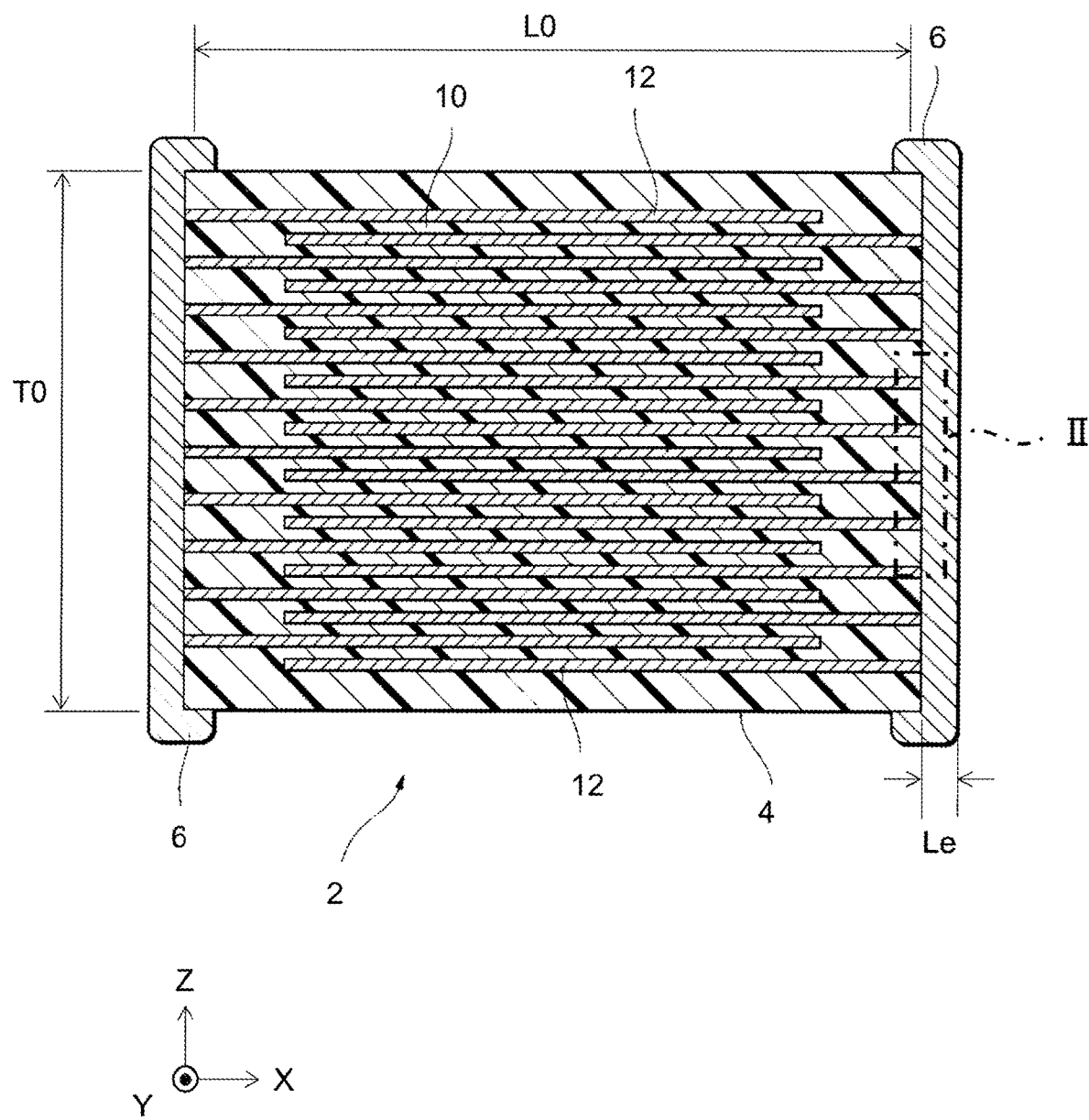
FIG. 1 is a schematic cross-sectional view of a multilayer ceramic capacitor according to an embodiment of the present invention.

As an embodiment of a ceramic electronic device according to the present invention, an overall configuration of a multilayer ceramic capacitor is described. FIG. 1 shows a cross-sectional view of a normal multilayer ceramic capacitor 2.

The multilayer ceramic capacitor 2 includes dielectric layers (ceramic layers) 10 and internal electrode layers 12 substantially parallel to a plane including the X-axis and the Y-axis and includes an element body 4 formed by alternately laminating the dielectric layers 10 and the internal electrode layers 12 along the Z-axis direction (lamination direction).

Here, "substantially parallel" means that most parts are parallel, but there may be a part that is not slightly parallel, and the dielectric layers 10 and the internal electrode layers 12 may slightly be uneven or inclined.

According to FIG. 1, the end surfaces of the element body 4 in the X-axis direction are flat surfaces. In other words, the dielectric layers 10 and the internal electrode layers 12 are laminated so as to be flush with each other. However, the end surfaces of the element body 4 in the X-axis direction may have a non-planar part. Moreover, the dielectric layers 10 and the internal electrode layers 12 may not be flush with each other and may be laminated, for example, in a state where the dielectric layers 10 are partly scraped off or the internal electrode layers 12 are partly protruding.

In the present embodiment, the X-axis, the Y-axis, and the Z-axis are perpendicular to each other.

In the present embodiment, the "inner side" means the side closer to the center of the multilayer ceramic capacitor 2, and the "outer side" means the side farther from the center of the multilayer ceramic capacitor 2.

In the present embodiment, the alternately-laminated internal electrode layers 12 on one side are electrically connected to the inside of an external electrode 6 formed on the outside of one end of the element body 4 in the X-axis direction, and the alternately-laminated internal electrode layers 12 on the other side are electrically connected to the inside of an external electrode 6 formed on the outside of the other end of the element body 4 in the X-axis direction.

In the present embodiment, the element body 4 has any shape and size. The element body 4 may have an elliptical columnar shape, a columnar shape, a prismatic shape, or the like. For example, the element body 4 may have a length L0 of 0.4-5.7 mm in the X-axis direction. For example, the element body 4 may have a length W0 of 0.2-5.0 mm in the Y-axis direction. For example, the element body 4 may have a length T0 of 0.2-2.0 mm in the Z-axis direction.

Each of the dielectric layers 10 has any thickness. For example, each of the dielectric layers 10 sandwiched by the internal electrode layers 12 preferably has a thickness Td of 30 μm or less, more preferably has a thickness Td of 15 μm or less, and still more preferably has a thickness Td of 10 μm or less.

The lamination number of the dielectric layers 10 is not limited, but is preferably 20 or more and is more preferably 50 or more.

The material of the dielectric layers 10 is not limited. In the present embodiment, however, the dielectric layers 10 include a perovskite compound represented by $ABO_3$ as a main component.

The main component of the dielectric layers 10 is a component contained in the dielectric layers 10 by 80 mass % or more.

The perovskite compound represented by $ABO_3$ is represented by, for example, $(Ba_{1-a-b}Sr_aCa_b)_m(Ti_{1-c-d}Zr_cHf_d)O_3$ and may satisfy $0.94<m<1.1$, $0≤a≤1$, $0≤b≤1$, $0≤c≤1$, and $0≤d≤1$.

"m" indicates an elemental ratio of A-site and B-site. For example, $0.94<m<1.1$ is satisfied.

"a" indicates an elemental ratio of Sr. For example, $0≤a≤1$ is satisfied. Preferably, $0≤a<1$ is satisfied.

"b" indicates an elemental ratio of Ca. $0≤b≤1$ is satisfied. Preferably, $0≤b<1$ is satisfied.

"c" indicates an elemental ratio of Zr. $0≤c≤1$ is satisfied. Preferably, $0≤c<1$ is satisfied.

"d" indicates an elemental ratio of Hf $0≤d≤1$ is satisfied. Preferably, $0≤d<1$ is satisfied.

The elemental ratio of oxygen (O) in the above-mentioned composition formula may slightly deviate from the stoichiometric composition.

In addition to the main component, the dielectric layers 10 according to the present embodiment may include a sub-component, such as Mn compounds, Mg compounds, Cr compounds, Ni compounds, rare earth element compounds, Si compounds, Li compounds, B compounds, and V compounds. There is no limit to the type, combination, or addition amount of the sub-component.

The conductive material contained in the internal electrode layers 12 is not limited, but is preferably Ni, Ni based alloy, Cu, Cu based alloy, Ag, Ag based alloy, Pd, Pd-based alloy, or the like. The Ni, Ni based alloy, Cu, Cu based alloy, Ag—Pd based alloy may contain various trace components, such as P, at about 0.1 mass % or less. In the present embodiment, the internal electrode layers 12 may contain Ni or Ni alloy as a main component. When Ni or Ni alloy is a main component, one or more sub-components selected from Mn, Cu, Cr, etc. may be contained.

The main component of the internal electrode layers 12 is a component contained in the internal electrode layers 12 by 90 mass % or more.

The internal electrode layers 12 may be formed using a commercially available electrode paste. The thickness of each of the internal electrode layers 12 may be determined appropriately based on the intended use and the like. For example, each of the internal electrode layers 12 can have a thickness Te of 3.0 μm or less.

The external electrodes 6 according to the present embodiment are formed on the element body 4 so as to electrically be connected with at least a part of the internal electrode layers 12.

Each of the external electrodes 6 according to the present embodiment includes at least a conductor 61.

The component of the conductor 61 contained in the external electrodes 6 is not limited and is a known conductive material, such as Ni, Cu, Sn, Ag, Pd, Au, and their alloy. In the present embodiment, the conductor 61 may include at least one of Cu, Cu alloys, Ag, and Ag alloys as a main component.

The main component of the conductor 61 is a component contained at 90 mass % or more in the conductor 61 excluding the coating layer by plating, conductive resin, or the like.

When the conductor 61 includes Cu, elements such as Al, Ni, Ag, Pd, Sn, Zn, P, Fe, and Mn may be contained.

The thickness Le of each of the external electrodes 6 is not limited and is, for example, 10-200 μm.

In the present embodiment, non-metal components 62 and voids (not shown) may exist in the external electrodes 6. Examples of the non-metal components 62 include a portion that has the same component as interface protrusions 16 mentioned below, but is not provided on at least a part of the surface on the dielectric layers 10 side. The non-metal components 62 may have the same composition as the interface protrusions 16 or may have a different composition from the interface protrusions 16. For example, since the glass (non-metal components 62) containing $SiO_2$ or the like exists in the external electrodes 6 other than the vicinity of the interface between the external electrode 6 and the dielectric layers 10, it is possible to prevent the composition deviation of the interface protrusions 16.

Figure 2:
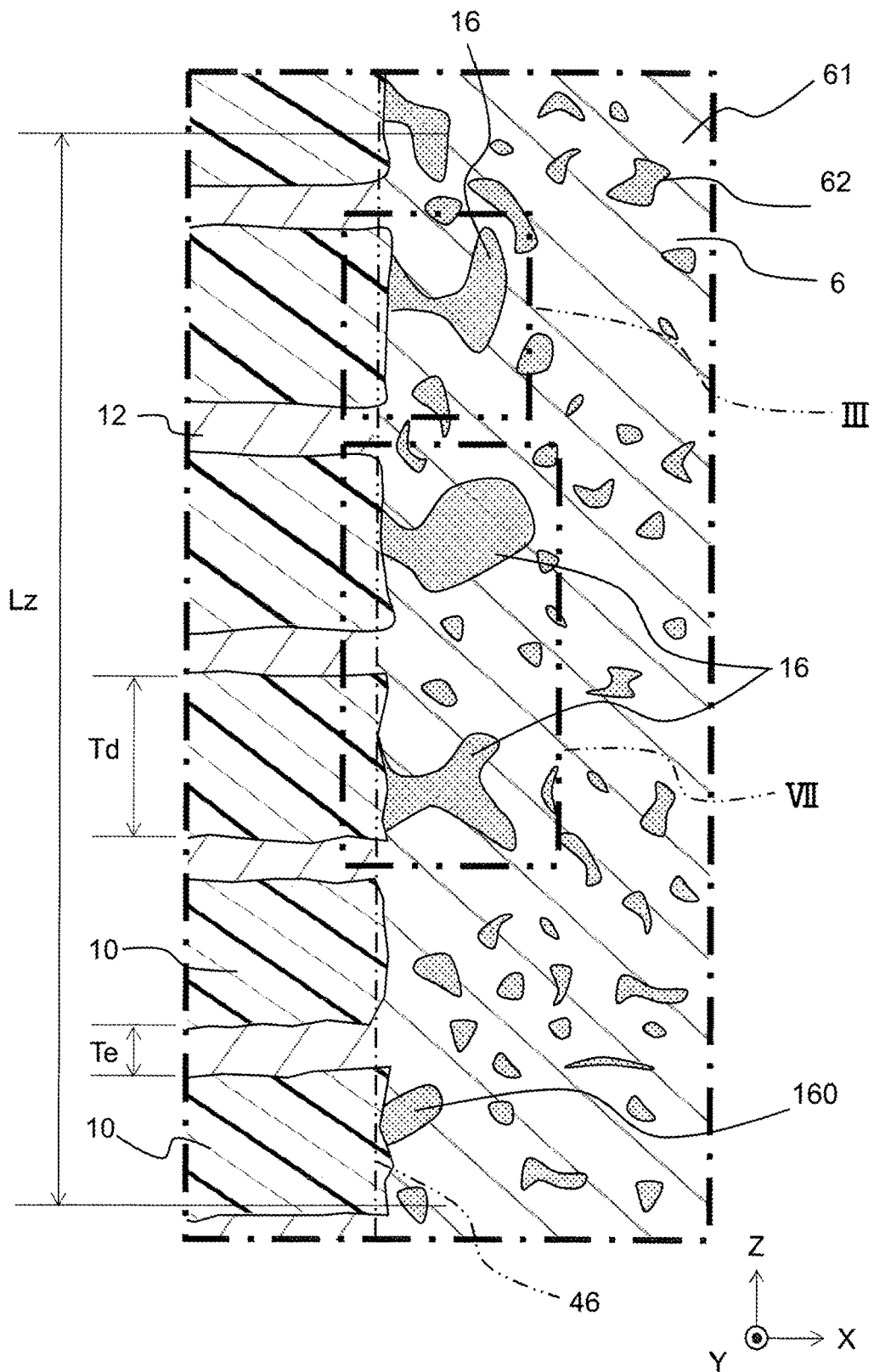
FIG. 2 is an enlarged view of the II part of FIG. 1.

FIG. 2 is an enlarged view of the II part of FIG. 1. In the multilayer ceramic capacitor according to the present embodiment, as shown in FIG. 2, at least a part of a joint boundary 46 between the external electrode 6 and the dielectric layers 10 includes amorphous interface protrusions 16 on the external electrode 6 side. That is, the interface protrusions 16 are formed by biting into the inside of the external electrode 6.

The interface protrusions 16 according to the present embodiment are made of an oxide. Thus, the interface protrusions 16 contained in the external electrodes 6 are easily bonded to the element body 4 including the dielectric layers 10 (oxide), and the element body 4 and the external electrodes 6 can be consequently firmly bonded.

Since at least a part of the oxide constituting the interface protrusions 16 according to the present embodiment is glass, the fluidity of the interface protrusions 16 is enhanced. Thus, the interface protrusions 16 can easily wet the conductor 61 of the external electrode 6 and the surface of the element body 4 on the external electrode 6 side. The glass contained in the interface protrusions 16 is oxide and thus easily bonded with the element body 4 including the dielectric layers 10 (oxide). Thus, the element body 4 and the external electrodes 6 can be joined more firmly.

The interface protrusions 16 include at least two selected from B, Si, and Zn as main components and preferably include at least Si and B as main components. As a result, the interface protrusions 16 are easily vitrified, and the element body 4 and the external electrodes 6 can be more firmly bonded to each other.

"The interface protrusions 16 include at least two selected from B, Si, and Zn as main components" means that the total of at least two selected from B, Si, and Zn occupies 90 parts by mol or more in the interface protrusions 16, provided that the total of elements other than oxygen is 100 parts by mol.

In the present embodiment, the interface protrusions 16 preferably include 0.15-0.82 parts by mol of B and more preferably include 0.28-0.70 parts by mol of B, provided that the total of B, Si, and Zn contained in the interface protrusions 16 is 1 part by mol.

In the present embodiment, the interface protrusions 16 preferably include 0.07-0.60 parts by mol of Si and more preferably include 0.10-0.35 parts by mol of Si, provided that the total of B, Si, and Zn contained in the interface protrusions 16 is 1 part by mol.

In the present embodiment, the interface protrusions 16 preferably include 0.10-0.61 parts by mol of Zn and more preferably include 0.15-0.46 parts by mol of Zn, provided that the total of B, Si, and Zn contained in the interface protrusions 16 is 1 part by mol.

In addition to B, Si, and Zn, the interface protrusions 16 may include an element constituting the dielectric layers 10, an element constituting the internal electrode layers 12, and an element constituting the conductor 61.

Each of the interface protrusions 16 according to the present embodiment has a shape that exhibits an anchor effect. The "shape that exhibits an anchor effect" means that the interface protrusions 16 do not spread thinly along the outer surface (Y-Z plane) of each of the dielectric layers 10, but spread three-dimensionally from the outer surface of each of the dielectric layers 10 toward the inside of each of the external electrodes 6 (i.e., outward in the X-axis direction) as shown in FIG. 2.

Each of the interface protrusions 16 according to the present embodiment may or may not include a constriction 16c, but preferably includes a constriction 16c. Here, the constriction 16c includes a narrow part 16a having a small width and a wide part 16b having a larger width than the narrow part 16a and disposed next to the narrow part 16a on the inner side of the external electrode 6 (outward in the X-axis direction) than the narrow part 16a.

Like an interface protrusion 160, even if there is no constriction 16c, an anchor effect can be exhibited as long as there are another one or more interface protrusions 160 inclined in at least one direction of the Y-axis direction or the Z-axis direction. For example, preferably, the inclination angle formed by the end surface (Y-Z plane) of the element body 4 in the X-axis direction and the interface protrusion 160 is 20° or more and 140° or less.

Each of the interface protrusions 16 may include a constriction 16c in the Y-Z cross section even if each of the interface protrusions 16 does not include a constriction 16c in the X-Z cross section.

The interface protrusions 16 are explained based on FIG. 3 to FIG. 6, which are enlarged views of the III part of FIG.

Figure 4:
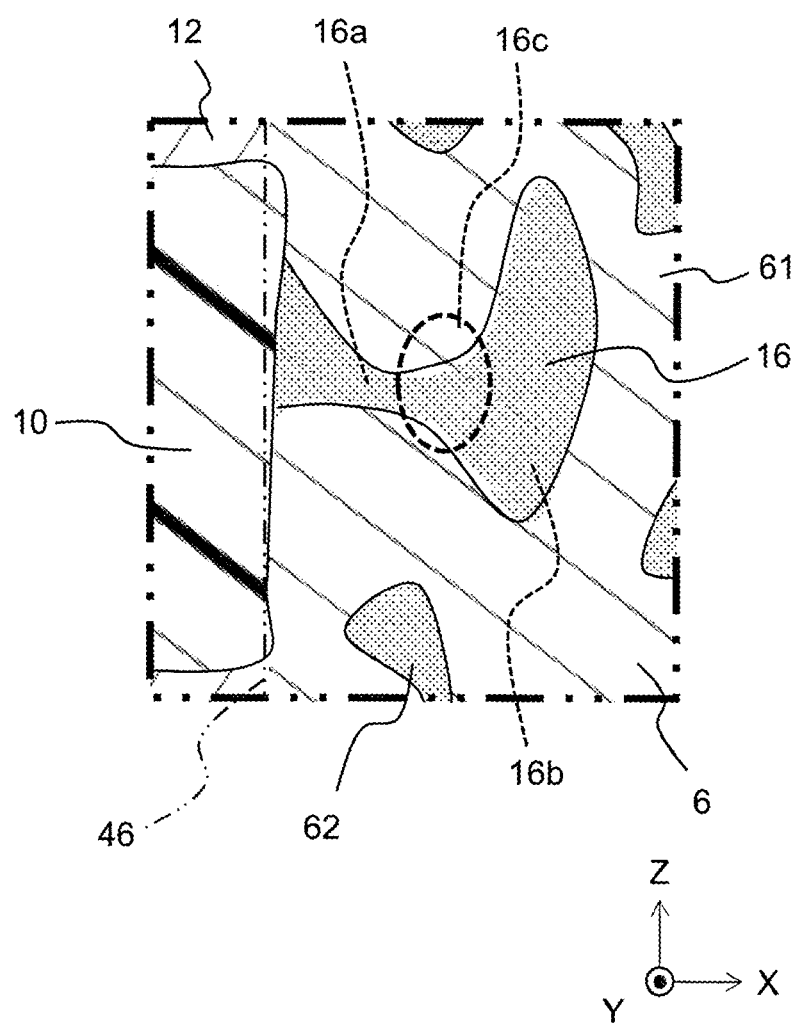
FIG. 4 is an enlarged view of the III part of FIG. 2.

2. As shown in FIG. 4, each of the interface protrusions 16 includes a constriction 16c in the X-axis direction.

Figure 3:
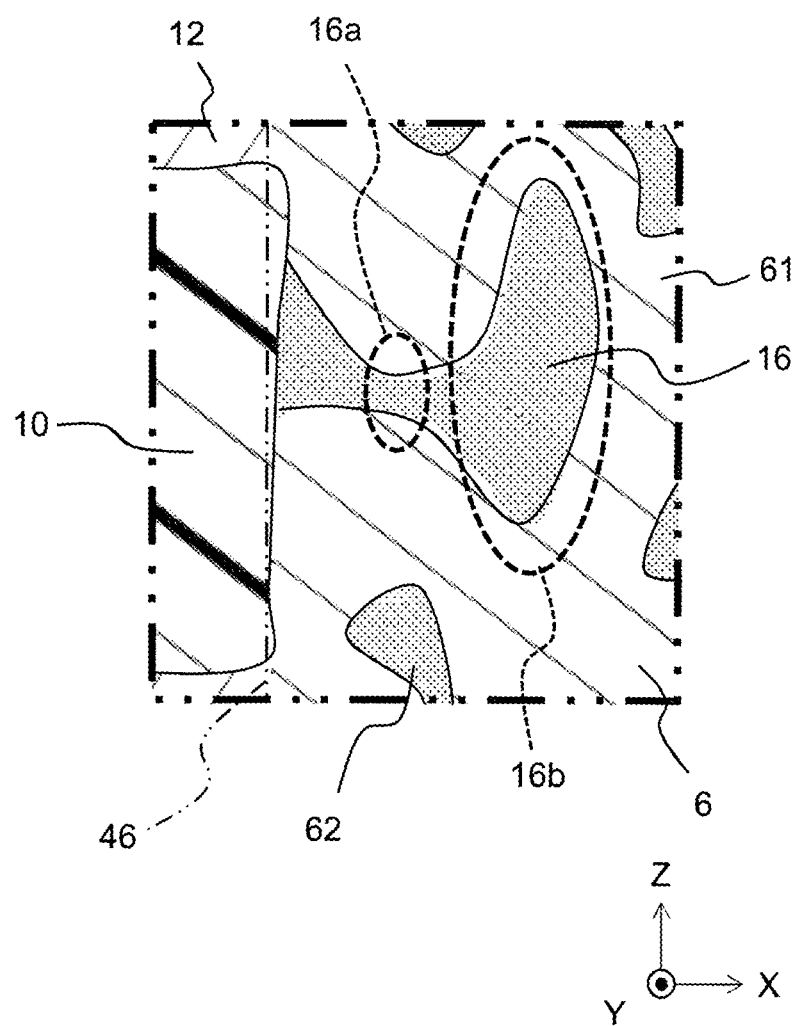
FIG. 3 is an enlarged view of the III part of FIG. 2.

As shown in FIG. 3 and FIG. 4, each of the interface protrusions 16 includes a narrow part 16a having a small width in the Z-axis direction (lamination direction) and a wide part 16b having a larger width in the Z-axis direction than the narrow part and disposed on the outer side of the interface protrusion 16 continuing to the narrow part 16a in the X-axis direction. In other words, each of the interface protrusions 16 includes a narrow part 16a and a wide part 16b disposed next to the narrow part 16a on the inner side of the narrow part 16a. Then, the constriction 16c is formed by the narrow part 16a and the wide part 16b.

Each of the interface protrusions 16 is intermittently disposed on the end surfaces of the element body 4 in the X-axis direction so that the conductor 61 and the internal electrode layers 12 are connected to each other. That is, the interface protrusions 16 are not substantially arranged at the connection points between the ends of the internal electrode layers 12 in the X-axis direction and the conductor 61.

In the observation of the X-Z cross section, however, there may be a part where the interface protrusion 16 covers the ends of some of the internal electrode layers 12 in the X-axis direction in the vicinity of the end surface of the element body 4 in the X-axis direction. Since the internal electrode layers 12 exist not only along the X-axis direction but also along the Y-axis direction, if there is a point where the interface protrusion 16 is not disposed even at a part of the end of each internal electrode layer 12 in the Y-axis direction, the internal electrode layer 12 and the conductor 61 can be electrically connected at this point. In other words, each internal electrode layer 12 and the conductor 61 can be connected electrically even if the end of each internal electrode layer 12 is partly covered with the interface protrusion 16.

The connection interface between each of the external electrodes 6 and the internal electrode layers 12 is indicated by the joint boundary 46, but is not necessarily clear. For example, the ends of the internal electrode layers 12 may enter the interface protrusions 16.

As shown in FIG. 1, when each of the external electrodes 6 is formed so as to extend from the end surface of the element body 4 in the X-axis direction to the end surface of the element body 4 in the Z-axis direction, the interface protrusions 16 may be formed not only on the end surface in the X-axis direction, but also on the end surface in the Z-axis direction.

Such a shape of the interface protrusion 16 including the constriction 16c can be achieved by, for example, applying a narrow-part paste containing oxide particles constituting the narrow part 16a and each having a small particle size (hereinafter, referred to as "small oxide particles") to the end surface of the element body 4 in the X-axis direction and thereafter applying a wide-part paste containing oxide particles constituting the wide part 16b and each having a large particle size (hereinafter, referred to as "large oxide particles") thereto and baking the pastes.

In addition, the interface protrusion 16 can also be formed by applying an interface-protrusion paste containing interface-protrusion particles each having a desired shape to the end surface of the element body 4 in the X-axis direction and baking it. The "interface-protrusion particles" are particles to be the interface protrusions 16 after being baked to the element body 4.

Preferably, a predetermined number or more of interface protrusions 16 each having the constriction 16c are present in a predetermined length Lz in the Z-axis direction of the joint boundary 46 between the element body 4 and the external electrode 6. Specifically, in a cross section (X-Z cross section) including the vicinity of the interface between the element body 4 and the external electrode 6, 2 or more interface protrusions 16 each having the constriction 16c are preferably present, and 10 or more interface protrusions 16 each having the constriction 16c are more preferably present, when the predetermined length Lz of the joint boundary 46 is 100 μm. The upper limit of the number of interface protrusions 16 is not limited, but is preferably 15 or less from the viewpoint of ensuring the electrical connection between the internal electrode layers 12 and the external electrode 6.

The predetermined length Lz is a distance between two points in the vicinity of the interface between the element body 4 and each of the external electrodes 6. Thus, when the joint boundary 46 between the element body 4 and each of the external electrodes 6 has irregularities, the predetermined length Lz is not the length of the irregularities, but is a distance between two points determined on the irregularities.

0.5 or more interface protrusions 16 each having the constriction 16c are preferably present per layer of the dielectric layers 10, and one or more interface protrusions 16 each having the constriction 16c are more preferably present per layer of the dielectric layers 10.

The number of interface protrusions 16 each having the constriction 16c is controlled by any method. The number of interface protrusions 16 each having the constriction 16c can be controlled by, for example, changing the content rate of small oxide particles contained in the narrow-part paste, large oxide particles contained in the wide-part paste, or interface-protrusion particles contained in the interface-protrusion paste. When the mass ratio of the amount of the small oxide particles to the amount of the large oxide particles is reduced, the number of interfacial protrusions 16 each having the constriction 16c tends to increase.

Figure 5:
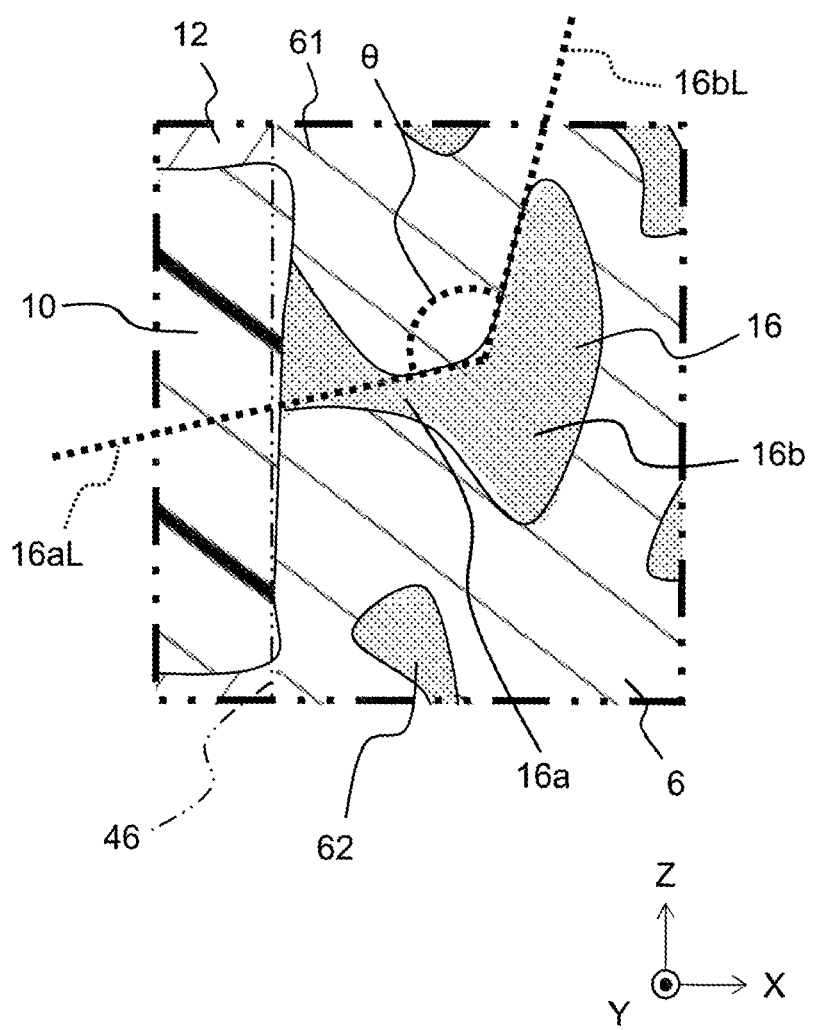
FIG. 5 is an enlarged view of the III part of FIG. 2.

As shown in FIG. 5, $0° \leq \theta \leq 140°$ is preferably satisfied, and $20° \leq \theta \leq 120°$ is more preferably satisfied, where θ is an angle of the constriction 16c having the smallest angle formed by a tangent line 16aL of the narrow part 16a and a tangent line 16bL of the wide part 16b.

When the angle θ is within the above-mentioned range, as compared to when the angle θ is below the above-mentioned range, the external electrode 6 (the conductor 61, the non-metal components 62, and the like) easily enters the constriction 16c of the interface protrusion 16, and the anchor effect is further enhanced. When the angle θ is within the above-mentioned range, as compared to when the angle θ is above the above-mentioned range, the external electrode 6 is easily sandwiched by the narrow part 6a and the wide part 6b of the interface protrusion 16, and the anchor effect is further enhanced. Thus, when the angle θ is within the above-mentioned range, the anchor effect of the interface protrusion 16 is further enhanced, and the element body 4 and the external electrode 6 are more firmly bonded to each other.

The angle θ is controlled by any method and is controlled by, for example, changing a ratio (Dw/Dn) of an average particle size (Dw) of large oxide particles to an average particle size (Dn) of small oxide particles contained in the narrow-part paste. When (Dw/Dn) is large, the angle θ tends to be small.

In addition, the angle θ may be controlled by using interface-protrusion particles each having a constriction with a desired angle as interface-protrusion particles contained in the interface-protrusion paste.

Figure 6:
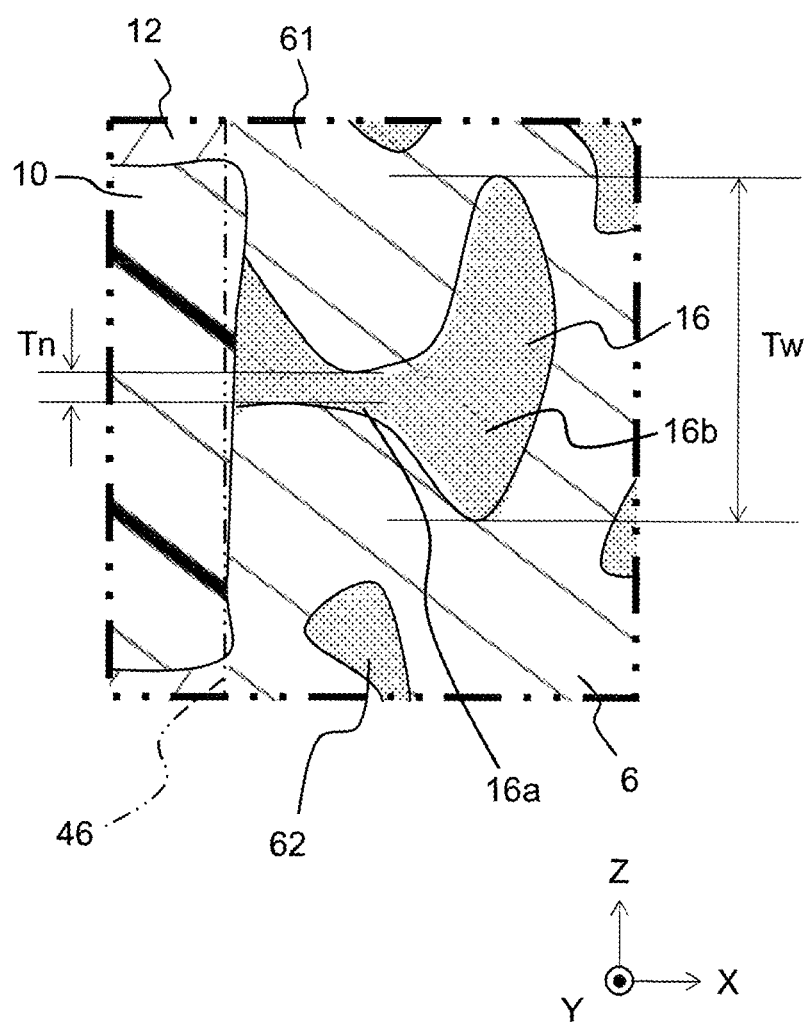
FIG. 6 is an enlarged view of the III part of FIG. 2.

As shown in FIG. 6, Tw/Tn is preferably 2 or more and is more preferably 2.5 or more, where Tn is a width of the narrow part 16a, and Tw is a width of the wide part 16b. The upper limit of Tw/Tn is not limited, but Tw/Tn is preferably 4 or less from the viewpoint of ensuring the strength of the interface protrusion 16.

When Tw/Tn is within the above-mentioned range, as compared to when Tw/Tn is below the above-mentioned range, the external electrode 6 easily enters the constriction 16c of the interface protrusion 16, the external electrode 6 is easily sandwiched by the narrow part 6a and the wide part 6b of the interface protrusion 16, and the anchor effect is further enhanced. Thus, when Tw/Tn is within the above-mentioned range, the anchor effect of the interface protrusion 16 is further enhanced, and the element body 4 and the external electrode 6 are more firmly bonded to each other.

Tw/Tn is controlled by any method and is controlled by, for example, changing a ratio (Dw/Dn) of an average particle size (Dw) of large oxide particles to an average particle size (Dn) of small oxide particles contained in the narrow-part paste. When (Dw/Dn) is large, Tw/Tn tends to be large.

In addition, Tw/Tn may be controlled by using interface-protrusion particles each having a constriction with a desired Tw/Tn as interface-protrusion particles contained in the interface-protrusion paste.

Preferably, a magnitude correlation between α, β, and γ satisfies β>α>δ, where α is a linear expansion coefficient of the dielectric layers 10, β is a linear expansion coefficient of the external electrodes 6, and δ is a linear expansion coefficient of the interface protrusions 16.

The interface protrusions 16 have a low linear expansion coefficient. Since the interface protrusions 16 are provided on the surface of the external electrode 6 on the dielectric layers 10 side, the components constituting the external electrodes 6 tighten the interface protrusions 16 with thermal stress during cooling in the baking. This makes it possible to more firmly bond the element body 4 and the external electrodes 6.

For example, the linear expansion coefficient α of $BaTiO_3$ (the main component of the dielectric layers 10) is 9.4 ppm/° C., the linear expansion coefficient β of Cu used for the external electrodes 6 is 17.5 ppm/° C., and the linear expansion coefficient δ the glass constituting the interface protrusions 16 is 2.8-9.0 ppm/° C.

The structure of the interface protrusions 16 can be analyzed by cross-sectional observation using scanning electron microscope (SEM), scanning transmission electron microscope (STEM), or the like. Specifically, when a cross section of the external electrodes 6 is observed with a backscattered electron image of SEM, a HAADF image of STEM, or the like, the conductor 61, which is often denser than the interface protrusions 16, the non-metal components 62, and the voids 63, can often be recognized as a bright contrast part, and the interface protrusions 16, the non-metal components 62, the voids 63, and the like can often be recognized as a dark contrast part.

The composition of the interface protrusions 16 can be measured by performing a component analysis with an electron probe microanalyzer (EPMA) in the cross-sectional observation. Preferably, the component analysis is performed at least at three points, and the composition of the interface protrusions 16 is calculated from an average of the measurement results. In the present embodiment, when a component analysis is performed by EPMA, an energy dispersion type spectroscope (EDS) or a wavelength dispersion type spectroscope (WDS) can be used as the X-ray spectroscope.

In the above, the present embodiment is explained focusing on the shape of the interface protrusion 16. Hereinafter, the shape of the conductor 61 is mainly explained.

Figure 7:
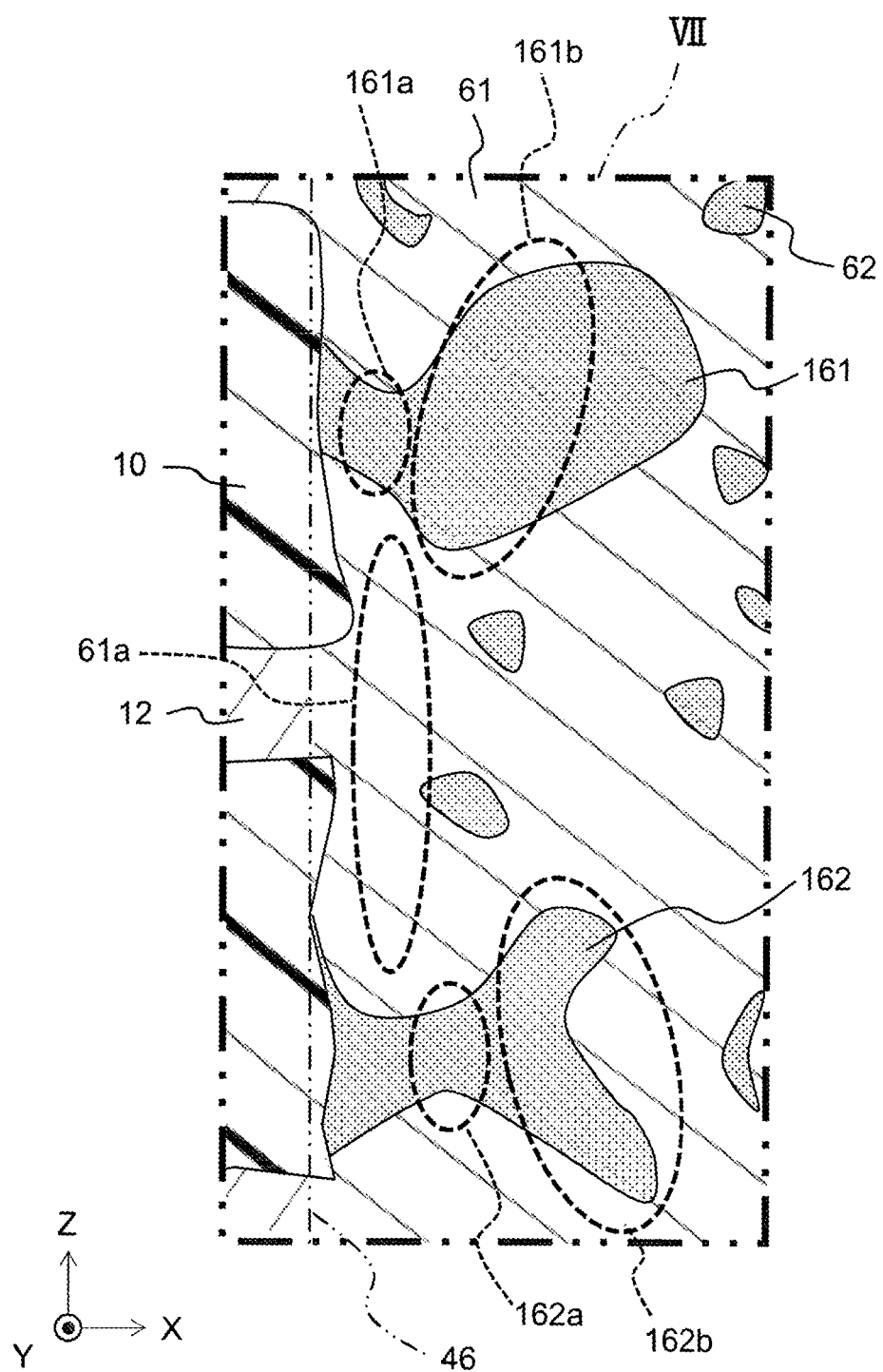
FIG. 7 is an enlarged view of the VII part of FIG. 2.

FIG. 7 is an enlarged view of the VII part of FIG. 2. FIG. 7 illustrates two interface protrusions 161 and 162. As shown in FIG. 7, between the interface protrusions 161 and 162 next to each other, the distance between the interface protrusion 161 and the interface protrusion 162 is small between a wide part 161b and a wide part 162b, but the distance between the interface protrusion 161 and the interface protrusion 162 is large between a wide part 162a and a wide part 162b.

In the region between the interface protrusions 161 and 162 next to each other, a between-narrow-part region 61a, where the conductor 61 is spread in the Z-axis direction, is easily formed toward the joint boundary 46, namely, inward in the X-axis direction. In the between-narrow-part region 61a, since the conductor 61 is spread in the Z-axis direction and sandwiched inward in the X-axis direction by the wide part 161b and the wide part 162b, the element body 4 and the external electrodes 6 can be firmly bonded to each other, and the joint reliability can be improved.

Next, a method of manufacturing the multilayer ceramic capacitor 1 shown in FIG. 1 is explained.

First, a dielectric-layer paste is prepared so as to manufacture green sheets to be constituting the dielectric layers 10 shown in FIG. 1 after firing.

The dielectric-layer paste is normally formed from an organic solvent based paste obtained by kneading a dielectric powder and an organic vehicle or from a water based paste.

A raw material of the dielectric powder is appropriately selected from various compounds to be composite oxides or oxides to be constituting the dielectric layers 10 mentioned above, such as carbonates, hydroxides, and organic metal compounds, and can be used by mixing them.

The organic vehicle is a binder dissolved in an organic solvent. The binder used for the organic vehicle is not limited and is appropriately selected from various normal binders, such as acrylic, ethyl cellulose, and butyral.

The organic solvent to be used is not limited and is appropriately selected from various organic solvents, such as alcohol, methyl ethyl ketone, acetone, toluene, tarpineol, and butyl carbitol, depending on the method to be used, such as the sheet method and the printing method.

If necessary, the dielectric-layer paste may contain additives selected from various dispersants, plasticizers, dielectrics, sub-component compounds, glass frit, and the like.

Examples of the plasticizers include phthalic esters, such as dioctyl phthalate and benzyl butyl phthalate, adipic acid, phosphoric acid esters, and glycols.

Next, an internal-electrode-layer paste for forming the internal electrode layers 12 shown in FIG. 1 is prepared. The internal-electrode-layer paste is prepared by kneading a conductive material made of the above-mentioned various conductive metals or alloys and the above-mentioned organic vehicle. Instead of the conductive material, oxides, organometallic compounds, or the like can also be used. The above-mentioned oxides and organometallic compounds become the above-mentioned conductive material after firing. If necessary, the internal-electrode-layer paste may contain a ceramic powder (e.g., barium titanate powder, calcium zirconate strontium) as an inhibitor. The inhibitor has an effect of preventing the sintering of the conductive powder in the firing step.

Green sheets to be the dielectric layers 10 after firing and internal electrode pattern layers to be the internal electrode layers 12 after firing are laminated alternately as shown in FIG. 1 using the above-prepared dielectric-layer paste and internal-electrode-layer paste to manufacture a green laminated body to be the element body 4 after firing.

Specifically, first, green sheets are formed on carrier sheets (e.g., PET film) as supports by a doctor blade method or the like. The green sheets are dried after being formed on the carrier sheets.

Next, internal electrode pattern layers are formed on the surfaces of the above-formed green sheets using the internal-electrode-layer paste to obtain green sheets including the internal electrode pattern layers. Then, the green sheets including the obtained internal electrode pattern layers are alternately laminated to obtain a green laminated body.

The internal electrode pattern layers are formed by any method, such as printing method and transfer method. The green sheets including the internal electrode pattern layers may be laminated via adhesive layers.

The obtained green laminated body is cut into a predetermined size to obtain a green chip. The green chip may be solidified by removing the plasticizer by solidification drying. The green chip after solidification and drying may be put into a barrel container together with a media and a polishing liquid and subjected to barrel-polishing by a horizontal centrifugal barrel machine or the like. The green chip after barrel-polishing is washed with water and dried. Solidification drying and barrel polishing may not necessarily be performed.

The green chip after drying is subjected to a binder removal step, a firing step, and, if necessary, an annealing step. Then, the element body 4 shown in FIG. 1 is obtained.

As the binder removal conditions, the heating rate is preferably 5-300° C./hour, the holding time is preferably 180-400° C., and the temperature holding time is preferably 0.5-24 hours. The binder removal atmosphere is the air or a reducing atmosphere.

The holding temperature during firing is preferably 1200-1350° C. and is more preferably 1220-1300° C., and its holding time is preferably 0.5-8 hours and is more preferably 1-3 hours.

Preferably, the firing atmosphere is a reducing atmosphere. As the atmospheric gas, for example, a mixed gas of $N_2$ and $H_2$ can be humidified and used.

The oxygen partial pressure during firing is appropriately determined based on the type of the conductive material in the internal-electrode-layer paste, but when a base metal, such as Ni and Ni alloy, is used as the conductive material, the oxygen partial pressure in the firing atmosphere is preferably $10^{-14}$ to $10^{-10}$ MPa.

Preferably, the element body 4 is annealed after being fired in a reducing atmosphere. Annealing is a treatment for reoxidizing the dielectric layers 10. This makes it possible to remarkably extend the IR life (high-temperature load life), and the reliability is thereby improved.

Preferably, the oxygen partial pressure in an annealing atmosphere is $10^{-9}$ to $10^{-5}$ MPa. When the oxygen partial pressure is $10^{-9}$ MPa or more, it is easy to efficiently reoxidize the dielectric layers 10.

Preferably, the holding temperature during annealing is 950-1150° C. When the holding temperature is 950° C. or more, it is easy to sufficiently oxidize the dielectric layers 10, and it is easy to improve the insulation resistance (IR) and the IR life.

As the annealing conditions except for this, the temperature holding time is preferably 0-20 hours, and the cooling rate is preferably 50-500° C./hour. As the atmospheric gas for annealing, for example, a humidified $N_2$ gas is preferably used.

In the above-mentioned binder removal treatment, firing, and annealing, for example, a wetter is used to humidify the $N_2$ gas, the mixed gas, and the like. In this case, the water temperature is preferably about 5-75° C.

The binder removal treatment, the firing, and the annealing may be performed continuously or independently.

Next, the interface protrusions 16 each having the constriction 16c are formed in the joint boundary 46 on the external electrode 6 side by applying a narrow-part paste containing small oxide particles and a wide-part paste containing large oxide particles onto both end surfaces of the element body 4 in the X-axis direction, drying them, and baking them.

Except for containing at least a metal powder constituting the conductor 61 and the above-mentioned small oxide particles, the narrow-part paste is prepared similarly to the internal-electrode-layer paste mentioned above. Except for containing at least a metal powder constituting the conductor 61 and the above-mentioned large oxide particles, the wide-part paste is prepared similarly to the internal-electrode-layer paste mentioned above.

Preferably, the amount of the small oxide particles in the narrow-part paste is smaller than that of the large oxide particles in the wide-part paste by mass ratio. This makes it easy to form the interface protrusions 16 each having the constriction 16c. Specifically, the amount of the small oxide particles in the narrow-part paste to the amount of the large oxide particles in the wide-part paste is preferably 0.5 or less and is more preferably 0.25-0.4 by mass ratio.

Preferably, the composition of the small oxide particles and the composition of the large oxide particles are the same as the composition of desired interface protrusions 16.

Preferably, an average particle size Dn of the small oxide particles is as large as a width Tn of the narrow part 16a, and an average particle size Dw of the large oxide particles is as large as a width Tw of the wide part 16b. That is, preferably, Dw/Dn is as large as a desired Tw/Tn.

The narrow-part paste is applied to the element body 4 by any method, such as dipping, printing, and coating. The wide-part paste is applied and thereafter dried.

Next, as with the narrow-part paste, the wide-part paste is applied on the narrow-part paste and dried.

Next, the narrow-part paste and the wide-part paste are baked. The narrow-part paste and the wide-part paste are baked with any conditions and are baked, for example, by being held at 700° C. to 1000° C. for 0.1 hours to 3 hours in a humidified $N_2$ or dried $N_2$ atmosphere.

Even in this case, the conductor 61 and the internal electrode layers 12 can electrically be conducted with each other. This is because, since the internal electrode layers 12 are made of metal and the dielectric layers 10 are oxide, the small oxide particles, which are oxide, are difficult to get wet with the internal electrode layers 12 and easy to get wet with the dielectric layers 10. Thus, many small oxide particles gather in the dielectric layers 10. Thus, it is unlikely that the small oxide particles interfere with the conduction between the conductor 61 and the internal electrode layers 12.

The large oxide particles are difficult to get wet with the conductor 61 and easy to get wet with the small oxide particles. Thus, the large oxide particles are likely to be present in the vicinity of the small oxide particles. As a result, the interface protrusions 16 each having the constriction 16c are easily formed by the large oxide particles and the small oxide particles.

Due to the baking step for the narrow-part paste and the wide-part paste mentioned above, the small oxide particles contained in the narrow-part paste constitute the narrow part 16a, and the large oxide particles contained in the wide-part paste constitute the wide part 16b, so that the interface protrusions 16 each having the constriction 16c are obtained.

In the above, the narrow-part paste and the wide-part paste are baked at the same time, but the wide-part paste may be baked after baking the narrow-part paste.

Next, if necessary, an outer-external-electrode paste is applied, dried, and baked on the outside of the baked area of the wide-part paste. Except for containing at least a metal powder constituting the conductor 61, the outer-external-electrode paste is prepared similarly to the internal-electrode-layer paste mentioned above. In addition to the metal powder, the outer-external-electrode paste may contain the non-metal components 62, such as glass frit.

In the present embodiment, the outer-external-electrode paste may or may not be applied, but the application of the outer-external-electrode paste can reduce the application thickness of the narrow-part paste and the wide-part paste and more securely provide the joint boundary 46 between the element body 4 and the external electrode 6 with the interface protrusions 16 each having the constriction 16c.

Moreover, if necessary, a coating layer from plating or the like is formed on the outside of the baked area of the wide-part paste. That is, the external electrodes 6 are formed by baking the narrow-part paste and the wide-part paste, baking the outer-external-electrode paste, and the coating layer from plating or the like.

The multilayer ceramic capacitor 2 manufactured in such a manner is mounted on a printed circuit board or the like by soldering or the like and is used in various electronics and the like.

The multilayer ceramic capacitor 2 according to the present embodiment can enhance the joint reliability between the element body 4 and the external electrodes 6. The reason is considered as below. In the present embodiment, at least a part of the joint boundary 46 between the external electrode 6 and the dielectric layers 10 includes an interface protrusion 16 on the external electrode 6 side, and the interface protrusion 16 is made of oxide. Thus, the interface protrusions 16 contained in the external electrode 6 are easily jointed with the element body 4 including the dielectric layers 10 (oxide), and the element body 4 and the external electrode 6 can consequently firmly be jointed.

In the present embodiment, even if the conductor 61 of the external electrodes 6 contains elements that are difficult to oxidize, such as Cu, the element body 4 and the external electrodes 6 can be bonded firmly by the interface protrusions 16 having an anchor effect.

Moreover, since the interface protrusions 16 each having the constriction 16c exhibit an anchor effect by the constrictions 16c, the element body 4 and the external electrodes 6 can be bonded more firmly.

Moreover, since at least a part of the oxide constituting the interface protrusions 16 is glass, the fluidity of the interface protrusions 16 is enhanced. Thus, the interface protrusions 16 can easily wet the conductor 61 of the external electrode 6 and the surface of the element body 4 on the external electrode 6 side. The glass contained in the interface protrusions 16 are oxide and thus easily bonded with the element body 4 including the dielectric layers 10 (oxide). Thus, the element body 4 and the external electrodes 6 can be joined more firmly.

Preferably, a magnitude correlation between α, β, and δ satisfies β>α>δ, where α is a linear expansion coefficient of the dielectric layers 10, β is a linear expansion coefficient of the external electrodes 6, and δ is a linear expansion coefficient of the interface protrusions 16.

Preferably, the interface protrusions 16 according to the present embodiment have a low linear expansion coefficient. Since the interface protrusions 16 are provided on the surface of the external electrode 6 on the dielectric layers 10 side, the components constituting the external electrodes 6 tighten the interface protrusions 16 with thermal stress during cooling in the baking. This makes it possible to more firmly bond the element body 4 and the external electrodes 6.

Second Embodiment

Except for the following respects, a multilayer ceramic capacitor according to the present embodiment is similar to the multilayer ceramic capacitor according to First Embodiment.

Figure 8:
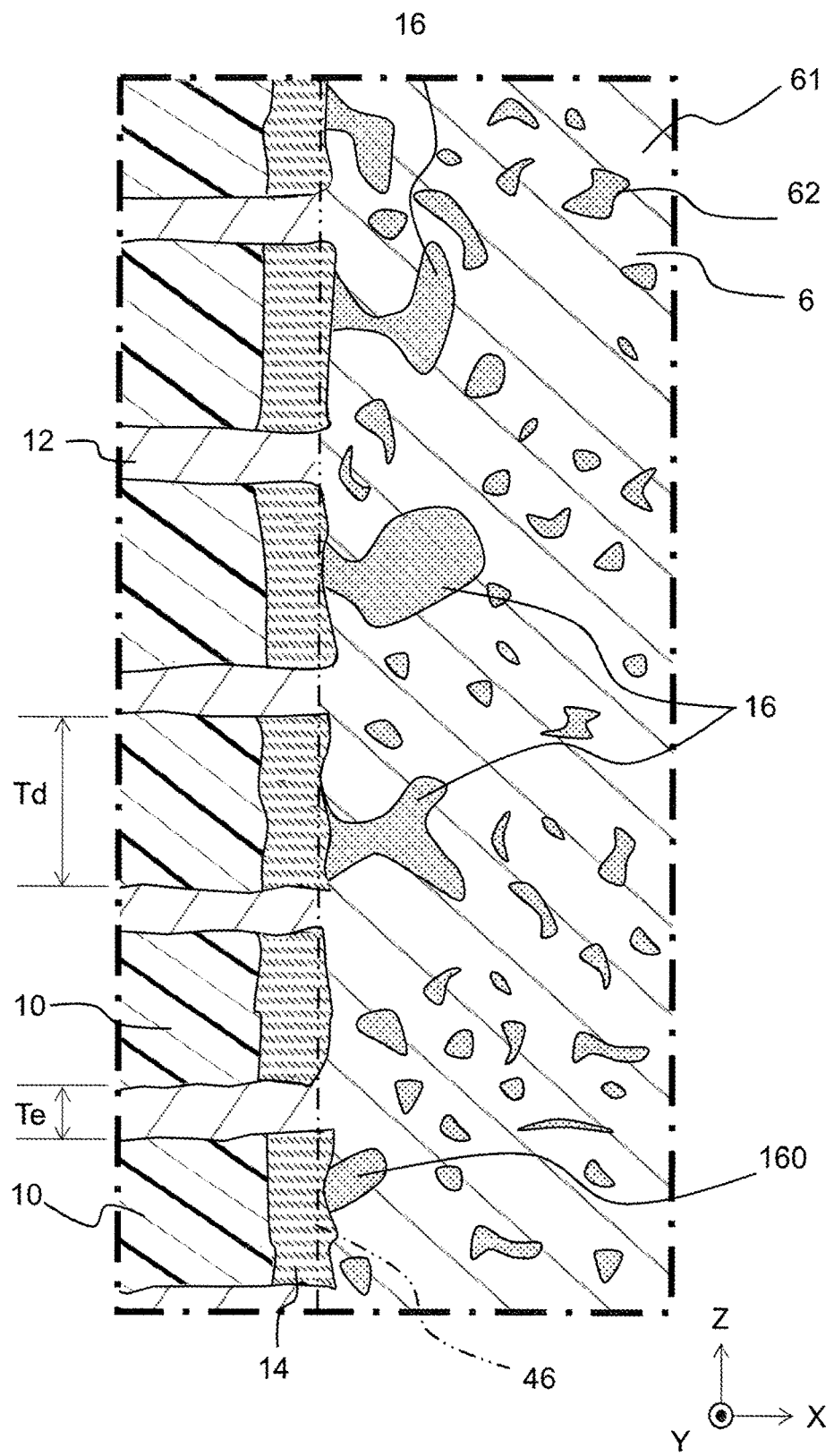
FIG. 8 is an enlarged view of a main part of a schematic cross-sectional view of a multilayer ceramic capacitor according to another embodiment of the present invention.

FIG. 8 is an enlarged view of the same portion as the II part of FIG. 1. As shown in FIG. 8, the element body 4 according to the present embodiment may include the boundary layers 14 at the ends of the dielectric layers 10 in the X-axis direction. The boundary layers 14 may be provided so as to be in contact with the internal electrode layers 12.

That is, in the present embodiment, at least a part of the joint boundary 46 between the external electrode 6 and the boundary layers 14 may include the interface protrusions 16 on the external electrode 6 side.

Each of the boundary layers 14 intermittently covers the end surface of the element body 4 in the X-axis direction so that the external electrode 6 and the internal electrode layers 12 are connected. That is, each of the boundary layers 14 is partly disconnected at the connection points between the ends of the internal electrode layers 12 in the X-axis direction and the external electrode 6.

When an X-Z cross section is observed, the point where each of the boundary layers 14 covers the ends of a part of the internal electrode layers 12 in the X-axis direction may exist near the end surface of the element body 4 in the X-axis direction. Each of the internal electrode layers 12 exists along not only the X-axis direction, but along the Y-axis direction. As long as the end of each of the internal electrode layers 12 even partly penetrates the boundary layer 14 in the Y-axis direction and is electrically conducted with the external electrode 6, each of the internal electrode layers 12 and the external electrode 6 can electrically be connected even if the ends of the internal electrode layers 12 are partly covered with the boundary layer 14.

Each of the boundary layers 14 according to the present embodiment includes an A-site element and a B-site element as a main component.

"Each of the boundary layers 14 includes an A-site element and a B-site element as a main component" means that the total of the A-site element and the B-site element occupies 90 parts by mol or more in each of the boundary layers 14, provided that the total of elements other than oxygen is 100 parts by mol.

The A-site element contained in each of the boundary layers 14 is not limited and may be Ba. The B-site element contained in each of the boundary layers is not limited and may be Ti.

In the present embodiment, when the total of Ba and Ti included in each of the boundary layers 14 is 1 part by mol, each of the boundary layers 14 preferably includes 0.27-0.40 parts by mol of Ba. In this case, each of the boundary layer 14 tends to have a linear expansion coefficient γ of 13.0 ppm/° C. to 14.5 ppm/° C. In the present embodiment, more preferably, each of the boundary layers 14 is $BaTi_2O_5$.

Preferably, a magnitude correlation between α, β, and γ satisfies β>γ>α, where α is a linear expansion coefficient of the dielectric layers 10, β is a linear expansion coefficient of the external electrodes 6.

For example, the linear expansion coefficient γ of $BaTi_2O_5$ constituting the boundary layers 14 is 13.3 ppm/° C.

Preferably, a magnitude correlation between α, β, γ, and σ satisfies β>γ>σ>α, where σ is a linear expansion coefficient of the internal electrode layers 12.

The structure of the boundary layers 14 can be analyzed by cross-sectional observation by SEM, STEM, or the like. The composition of the boundary layers 14 can be measured by performing a component analysis by EPMA in the cross-sectional observation. Preferably, the component analysis is performed at least at three points, and the composition of the boundary layers 14 is calculated from an average of the measurement results.

The boundary layers 14 can be formed by subjecting the narrow-part paste and the wide-part paste to a high-temperature baking treatment, subjecting the narrow-part paste and the wide-part paste to a baking treatment after adding Ti-rich compounds, such as $BaTi_2O_5$ and $TiO_2$, to them, or using a boundary-layer paste. Preferably, a boundary-layer paste is used. The boundary layers 14 may be formed by ceramic coating with various vapor deposition methods without using a paste.

When a high-temperature baking treatment is employed, the holding temperature is preferably 800-1000° C., and the holding time is preferably 0.1-3 hours. The boundary layers 14 are formed by baking the narrow-part paste and the wide-part paste at a higher temperature than a normal baking treatment or by baking the narrow-part paste and the wide-part paste over a long period of time.

When a boundary-layer paste is employed, the boundary layers 14 can be formed by applying a boundary-layer paste onto the end surfaces of green chips before firing in the X-axis direction or the end surfaces of the element body 4 after firing in the X-axis direction and baking it.

In this case, the boundary-layer paste contains a boundary-layer powder, a binder, and a solvent, and if necessary, a dispersant, a plasticizer, or the like may be added. The boundary-layer powder is obtained by mixing starting raw materials, such as BaO powder and $TiO_2$ powder, in a predetermined ratio and then calcining and pulverizing the mixture.

The boundary-layer paste can be applied to the green chips or the element body 4 by various printing methods, such as a dip method and screen printing, a coating method using a dispenser or the like, a spraying method using a spray, or the like. The boundary-layer paste is applied to at least the end surfaces in the X-axis direction and may further be applied to a part of the end surfaces in the Z-axis direction. At this time, the average length Lr (average thickness) of the boundary layers 14 can be adjusted by controlling the application amount of the boundary-layer paste.

When the boundary-layer paste is applied to the element body 4, the boundary layers 14 are formed by drying the boundary-layer paste after application and subjecting it to a baking treatment at a temperature of 700-1000° C. for 0.1-3 hours. In this case, the boundary-layer paste may be baked at the same time as baking the narrow-part paste and the wide-part paste. The average length Lr of the boundary layers 14 is also affected by the conditions of the baking treatment. If the temperature during the baking treatment is low or the holding time is short, the average length Lr tends to be small (the average thickness becomes small). In addition, the average length Lr may be affected by the application thickness of the boundary layer-paste. When the boundary-layer paste is applied to the green chips, the boundary-layer paste is baked at the time of firing the green chips.

When the boundary layers 14 are formed using a paste, the element body 4 is preferably subjected to a wet barrel polishing before applying the paste and/or after baking the paste. In the wet barrel polishing, the ceramic component (dielectric layers 10 or boundary layers 14) is selectively polished rather than the ends of the internal electrode layers 12, and the ends of the internal electrode layers 12 are easily exposed on the outermost surface of the end surface 4a. That is, the wet barrel polishing improves the electrical bonding of the internal electrode layers 12 to the external electrode 6.

In the present embodiment, for example, a boundary-layer paste is applied to the fired element body 4, a narrow-part paste is applied thereto, a wide-part paste is applied thereto, an outer-external-electrode paste is applied thereto, and the boundary-layer paste, the narrow-part paste, the wide-part paste, and the outer-external-electrode paste are baked at the same time. The baking temperature is not limited, but is 800-1000° C.

Even in this case, the external electrodes 6 and the internal electrode layers 12 can electrically be conducted with each other. This is because the glass component or the like constituting the interface protrusions 16, $BaTi_2O_5$ or the like constituting the boundary layers 14, and $ABO_3$ constituting the dielectric layers 10 react with each other after the conductive material of the internal electrode layers 12 and the conductor of the external electrodes 6 react with each other, and it is thereby difficult to form the oxide from the boundary-layer paste at the ends of the internal electrode layers 12 in the X-axis direction.

In the present embodiment, since the boundary layers 14 are provided, it is possible to effectively prevent the thermal stress generated on the interfaces between the external electrodes 6 and the dielectric layers 10 due to, for example, thermal shock during cooling in the baking, during manufacturing, during use, or the like. The reason is considered to be as follows.

In the present embodiment, the dielectric layers 10 include a perovskite compound represented by $ABO_3$ as a main component, and the element body 4 includes the boundary layers 14 containing an A-site element and a B-site element in a predetermined molar ratio at the ends of the dielectric layers 10. Thus, it is considered that the dielectric layers 10 and the boundary layers 14 are easy to be diffused to each other, and that the dielectric layers 10 and the boundary layers 14 are firmly bonded to each other.

It is further considered that the B-site element content is higher than the A-site element content in the boundary layers 14, and the external electrodes 6 and the boundary layers 14 are thereby firmly bonded to each other.

In the present embodiment, since the external electrodes 6 and the boundary layers 14 are firmly bonded as well as the dielectric layers 10 and the boundary layers 14 are firmly bonded, the element body 4 and the external electrodes 6 are firmly bonded. The fact that the bonding strength is high can be confirmed by, for example, tensile strength test.

In addition, when the conductor 61 of the baked electrode layer 6a of the external electrode 6 includes at least one of Cu, Cu alloys, Ag, and Ag alloys as a main component, a linear expansion coefficient γ of the boundary layers 14 is smaller than a linear expansion coefficient β of the external electrodes 6 and larger than a linear expansion coefficient α of the dielectric layers 10. In the present invention, it is considered that the inclusion of the boundary layers 14 can reduce the thermal stress generated on the interfaces between the external electrodes 6 and the dielectric layers 10 and can further increase the bonding strength between the dielectric layers 10 and the external electrodes 6.

When the internal electrode layers 12 include Ni or Ni alloy as a main component, a magnitude correlation between α, γ, and σ satisfies γ>σ>α, where α is a linear expansion coefficient of the dielectric layers 10, γ is a linear expansion coefficient of the boundary layers 14, and σ is a linear expansion coefficient of the internal electrode layers 12. In the present embodiment, the boundary layers 14 are provided so as to contact with the internal electrode layers 12. Thus, the boundary layers 14 having a linear expansion coefficient closer to that of the internal electrode layer 12 are in contact with the internal electrode layers 12, and the effect of preventing the peeling of the dielectric layers 10 and the internal electrode layers 12 near the surface of the element body 4 is enhanced.

Hereinbefore, embodiments of the present invention are explained, but the present invention is not limited to the above-mentioned embodiments and can be modified variously without departing from the gist of the present invention.

For example, the ceramic electronic device of the present invention is applicable not only to a multilayer ceramic capacitor, but also to other ceramic electronic devices. Other ceramic electronic devices include all electronic devices having a ceramic layer and an external electrode, such as disk-shaped capacitors, bandpass filters, multilayer three-terminal filters, piezoelectric elements, PTC thermistors, NTC thermistors, and varistors.

In the above, for example, the interface protrusions 16 each having the constriction are formed by the narrow-part paste and the wide-part paste, but the interface protrusions 16 may be formed using an interface-protrusion paste containing interface-protrusion particles each having a desired shape.

Specifically, the interface protrusions 16 are formed by applying an interface-protrusion paste containing interface-protrusion particles, instead of the narrow-part paste and the wide-part paste, onto both end surfaces of the element body 4 in the X-axis direction and baking it. Except for containing at least a metal powder constituting the conductor 61 and interface-protrusion particles, the interface-protrusion paste is prepared similarly to the internal-electrode-layer paste mentioned above.

The "interface-protrusion particles" are particles to be the interface protrusions 16 after baking and preferably satisfy desired angle θ and Tw/Tn.

As a manufacturing method, an interface-protrusion paste is applied to the end surfaces of the element body 4 in the X-axis direction, dried, and then baked.

As a result, interface-protrusion particles contained in the interface-protrusion paste become the interface protrusions 16.

In the present embodiment, the dielectric layers 10 and the internal electrode layers 12 are laminated in the Z-axis direction, but the lamination direction may be the X-axis direction or the Y-axis direction. In that case, the external electrodes 6 are formed according to the exposed surfaces of the internal electrode layers 12. The element body 4 is not necessarily a laminated body and may be a single layer. The internal electrode layers 12 may be drawn out to the outer surface of the element body 4 via through-hole electrodes. In this case, the through-hole electrodes and the external electrodes 6 are electrically connected to each other.

EXAMPLES

Hereinafter, the present invention is explained in more detail with examples of the present invention, but the present invention is not limited to the examples.

Experiment 1

<Sample No. 1>

A $BaTiO_3$ powder was prepared as a main raw material for a dielectric powder. Next, for 100 parts by mol of the main raw material, 1.6 parts by mol of a $MgCO_3$ powder were weighed, 1.0 part by mol of a $Dy_2O_3$ powder was weighed, 0.4 parts by mol of a $MnCO_3$ powder was weighed, and 0.06 parts by mol of a $V_2O_5$ powder was weighed, and 2.0 parts by mol a $SiO_2$ powder was weighed as sub-components. The powders of the sub-components were mixed in wet manner, dried, and calcined with a ball mill to obtain a sub-component calcined powder.

Next, the main raw material of the dielectric powder: 100 parts by mass, the sub-component calcined powder obtained above, acrylic resin: 7 parts by mass, butyl benzyl phthalate (BBP) as a plasticizer: 4 parts by mass, and methyl ethyl ketone as a solvent: 80 parts by mass were mixed with a ball mill and turned into paste to obtain a dielectric-layer paste.

Apart from the above, Ni particles: 56 parts by mass, tarpineol: 40 parts by mass, ethyl cellulose (molecular weight: 140,000): 4 parts by mass, and benzotriazole: 1 part by mass were kneaded with a triple-roll mill and turned into paste to form an internal-electrode-layer paste.

Then, green sheets were formed on PET films using the above-prepared dielectric-layer paste. Green sheets were formed by subjecting the internal-electrode-layer paste to screen printing.

The green sheets were laminated and bonded with pressure to obtain a green laminated body, and the green laminated body was cut into a predetermined size to obtain green chips.

Next, the obtained green chips were subjected to binder removal treatment, firing, and annealing with the following conditions to obtain a sintered body (element body 4).

The conditions for the binder removal treatment were holding temperature: 260° C. and atmosphere: air.

The firing condition was holding temperature: 1250° C. The atmospheric gas was a humidified $N_2+H_2$ mixed gas, and the oxygen partial pressure was set to $10^{-9}$ MPa or less.

The annealing conditions were holding temperature: 1050° C. and atmospheric gas: humidified $N_2$ gas (oxygen partial pressure: $10^{-8}$ MPa or less).

A wetter was used to humidify the atmospheric gas during firing and annealing.

Next, small oxide particles and large oxide particles made of $B_2O_3$—$SiO_2$—$ZnO$ were prepared. The ratio (Dw/Dn) of the average particle size (Dw) of the large oxide particles to the average particle size (Dn) of the small oxide particles was 2.8. Then, a narrow-part paste containing Cu as a metal powder and containing the above-mentioned small oxide particles was prepared. Moreover, a wide-part paste containing Cu as a metal powder and containing the above-mentioned large oxide particles was prepared.

The amount of the small oxide particles in the narrow-part paste to the amount of the large oxide particles in the wide-part paste was 0.44 by mass ratio.

The narrow-part paste was applied to both end surfaces of the element body 4 in the X-axis direction by a dipping method and dried, and the wide-part paste was applied thereto by a dipping method, dried, and baked at 800° C.

A capacitor sample 2 (multilayer ceramic capacitor 2) with the external electrodes 6 was obtained in such a manner.

The size of the element body 4 of the obtained capacitor sample 2 was L0×W0×T0=2.0 mm×1.25 mm×1.25 mm. The number of dielectric layers 10 sandwiched by the internal electrode layers 12 was 80.

The obtained capacitor sample was cut in parallel to the X-Z plane, and the obtained cross section was subjected to mirror polishing and then photographed by SEM. An elemental analysis by EPMA was carried out for the interface protrusions 16 in the cross section of the obtained multilayer ceramic capacitor. As a result, it was confirmed that the elemental composition of the small oxide particles and the large oxide particles and the elemental composition of the interface protrusions 16 were substantially the same.

In a cross section (X-Z cross section) including the vicinity of the interfaces between the element body 4 and the external electrodes 6, 10 photographs were taken so as to include a predetermined length Lz (100 μm), and the numbers of "interface protrusions 16" and "interface protrusions 16 each having a constriction 16c" in the predetermined length Lz of the joint boundary 46 in each of the photographs were counted to determine the presence and obtain average values of the numbers. As a result, it was confirmed that, in Sample No. 1, "interface protrusions 16 each having a constriction 16c" were present, and 2.8 "interface protrusions 16 each having a constriction 16c" were formed on average in the predetermined length Lz (100 μm).

The average thickness Td of the dielectric layers 10 sandwiched by the internal electrode layers 12, the average thickness Te of the internal electrode layers 12, the average length Lr of the boundary layers 14, and the average thickness Le of the external electrodes 6 were measured. Each of them was measured at 10 points to calculate each average. The results were as follows.

Average Thickness Td of Dielectric Layers 10 Sandwiched by Internal Electrode Layers 12: 10 μm Average Thickness Te of Internal Electrode Layers 12: 1.5 μm Average Length Lr of Boundary Layers 14: 8.2 μm Average Length Le of External Electrodes 6: 89 μm For the obtained capacitor sample 2, a linear expansion coefficient α of the dielectric layers 10, a linear expansion coefficient β of the external electrodes 6, and a linear expansion coefficient δ of the interface protrusions 16, were obtained in the following manner, and a tensile strength test and a 85° C. thermal shock tensile strength test were carried out in the following manner.

Linear Expansion Coefficient

The linear expansion coefficients of α, β, and δ were measured from values in the range of 20-400° C. in the air by thermomechanical analysis after preparing a sintered body and glass according to the composition. The magnitude correlation of Sample No. 1 was β>α>δ.

Air-Tank-Type Thermal Shock Test

In an air-tank-type thermal shock test, the test samples (capacitor samples) were held in an air tank at −55° C. for 30 minutes and then held in an air tank at 150° C. for 30 minutes per cycle, and this was repeated for 1000 cycles. In this test, pass/fail was determined based on the change rate in capacitance. A sample where a change rate ($C_β/C_α$) in a capacitance $C_β$ after the test to a capacitance $C_α$ before the test was 0.9 (90%) or more was considered to be pass, and a sample where a change rate ($C_β/C_α$) in a capacitance $C_β$ after the test to a capacitance $C_α$ before the test was less than 0.9 was considered to be fail. In Sample No. 1, the test was performed on 80 capacitor samples. A ratio of failed samples (NG ratio) was calculated. The results are shown in Table 1.

<Sample No. 2>

In Sample No. 2, except for using an external-electrode paste containing Cu as a metal powder and substantially containing no oxide instead of "the narrow-part paste and the wide-part paste", as with Sample No. 1, capacitor samples were obtained, the presence of "interface protrusions 16" and "interface protrusions 16 each having a constriction 16c" in the external electrodes 6 was determined, and an air-tank-type thermal shock test was performed. The results are shown in Table 1.

<Sample No. 3>

In Sample No. 3, except for using an external-electrode paste containing Cu as a metal powder and substantially containing no oxide instead of "the wide-part paste", as with Sample No. 1, capacitor samples were obtained, the presence of "interface protrusions 16" and "interface protrusions 16 each having a constriction 16c" in the external electrodes 6 was determined, and an air-tank-type thermal shock test was performed. The results are shown in Table 1.

TABLE 1

| Sample No. | Presence of Interface Protrusion in External Electrode | Presence of Constriction of Interface Protrusion in External Electrode | Air-tank-type Thermal Shock Test |
| --- | --- | --- | --- |
| 2 | absent | | 5/80 |
| 3 | present | absent | 2/80 |
| 1 | present | present | 0/80 |

According to Table 1, when the interface protrusions 16 were present (Sample Nos. 1 and 3), the results of the air-tank-type thermal shock test were more favorable than those when the interface protrusions 16 were not present (Sample No. 2). Thus, when the interface protrusions 16 were present (Sample Nos. 1 and 3), the joint reliability was considered to be higher than that when the interface protrusions 16 were not present (Sample No. 2).

According to Table 1, when the interface protrusions 16 were provided with constrictions 16c (Sample No. 1), the results of the air-tank-type thermal shock test were more favorable than those when the interface protrusions 16 were not provided with constrictions 16c (Sample No. 3). Thus, when the interface protrusions 16 were provided with constrictions 16c (Sample No. 1), the joint reliability was considered to be higher than that when the interface protrusions 16 were not provided with constrictions 16c (Sample No. 3).

Experiment 2

<Sample No. 1>

As for Sample No. 1 mentioned above, a liquid-tank-type thermal shock test was performed in the following manner.

Liquid-Tank-Type Thermal Shock Test

In the liquid-tank-type thermal shock test, a thermal cycle was performed with a liquid tank, not an air tank. When a liquid tank is used, a steeper temperature change is applied to test samples compared to when an air tank is used, and the joint reliability of test samples can thus be evaluated under harsher conditions than in the air-tank-type test. Specifically, in Sample No. 1, the test samples were held in a liquid tank at −55° C. for 30 minutes and then held in a liquid tank at 150° C. for 30 minutes per cycle, and this was repeated for 1000 cycles. As with the air-tank-type thermal shock test, pass/fail in the liquid-tank-type thermal shock test was determined based on the change rate in capacitance. In Sample No. 1, the test was performed on 80 capacitor samples. A ratio of failed samples (NG ratio) was calculated. The results are shown in Table 2.

<Sample No. 11>

In Sample No. 11, except for using an interface-protrusion paste containing interface-protrusion particles instead of a narrow-part paste and a wide-part paste, as with Sample No. 1, capacitor samples were obtained, and a liquid-tank-type thermal shock test was performed. The results are shown in Table 2. The total mass of the small oxide particles and the large oxide particles in Sample No. 1 and the mass of the interface-protrusion particles in Sample No. 11 were equal to each other.

In Sample No. 11, the presence of interface protrusions 16 each having a constriction 16c on the surfaces of the external electrodes 6 on the dielectric layers 10 side was confirmed by the SEM observation and the elemental analysis by EPMA.

<Sample No. 12>

In Sample No. 12, instead of a narrow-part paste and a wide-part paste, except for applying and drying the interface-protrusion paste used in Sample No. 11 and thereafter applying, drying, and baking an outer-external-electrode paste, as with Sample No. 1, capacitor samples were obtained, and a liquid-tank-type thermal shock test was performed. The results are shown in Table 2. The outer-external-electrode paste contained Cu as a metal powder and further contained glass frit.

In Sample No. 12, the presence of interface protrusions 16 each having a constriction 16c on the surfaces of the external electrodes 6 on the dielectric layers 10 side was confirmed by the SEM observation and the elemental analysis by EPMA.

TABLE 2

| Sample No. | Manufacturing Method | Liquid-tank-type Thermal Shock Test |
|---|---|---|
| 1 | manufacturing method using narrow-part paste and wide-part paste | 0/80 |
| 11 | manufacturing method using interface-protrusion paste | 4/80 |
| 12 | manufacturing method using interface-protrusion paste and outer-external-electrode paste | 2/80 |

According to Table 2, when the narrow-part paste and the wide-part paste were used (Sample No. 1), the results of the liquid-tank-type thermal shock test were more favorable than those when the interface-protrusion paste was used (Sample Nos. 11 and 12). Thus, when the narrow-part paste and the wide-part paste were used (Sample No. 1), the joint reliability was considered to be higher than that when the interface-protrusion paste was used (Sample Nos. 11 and 12).

Experiment 3

In Sample Nos. 21 and 22, except for changing the mass ratio of small oxide particles contained in a narrow-part paste to large oxide particles contained in a wide-part paste as shown in Table 3, as with Sample No. 1, capacitor samples were obtained, and an air-tank-type thermal shock test and a liquid-tank-type thermal shock test were performed. The results are shown in Table 3.

TABLE 3

| Sample No. | Mass Ratio of Amount of Small Oxide Particles to Amount of Large Oxide Particles | Number of Interface Protrusions in Length of 100 μm of External Electrode in Z-axis Direction | Air-tank-type Thermal Shock Test | Liquid-tank-type Thermal Shock Test |
|---|---|---|---|---|
| 21 | 0.72 | 0.6 | 0/80 | 2/80 |
| 1 | 0.44 | 2.8 | 0/80 | 0/80 |
| 22 | 0.21 | 13.2 | 0/80 | 0/80 |

According to Table 3, when the average number of interface protrusions 16 each having a constriction 16c in the length of 100 μm of the joint boundary 46 in the Z-axis direction was 2.8 or more (Sample Nos. 1 and 22), the results of the liquid-tank-type thermal shock test were more favorable than those when the average number of interface protrusions 16 each having a constriction 16c in the length of 100 μm of the joint boundary 46 in the Z-axis direction was 0.6 (Sample No. 1). Thus, when the average number of interface protrusions 16 each having a constriction 16c in the length of 100 μm of the joint boundary 46 in the Z-axis direction was 2.8 or more (Sample Nos. 1 and 22), the joint reliability was considered to be higher than that when the average number of interface protrusions 16 each having a constriction 16c in the length of 100 μm of the joint boundary 46 in the Z-axis direction was 0.6 (Sample No. 1).

Experiment 4

<Sample No. 1>

As for Sample No. 1 mentioned above, in a cross section (X-Z cross section) including the vicinity of the interfaces between the element body 4 and the external electrodes 6, 10 photographs were taken so as to include a predetermined length Lz (100 μm), and Tw/Tn of the interface protrusion 16 including the constriction 16c having the largest Tw in the predetermined length Lz of the joint boundary 46 in each of the photographs was calculated to obtain an average. The results are shown in Table 4.

As for Sample No. 1 mentioned above, in a cross section (X-Z cross section) of including the vicinity of the interfaces between the element body 4 and the external electrodes 6, 10 photographs were taken so as to include a predetermined length Lz (100 µm), and an angle θ of the interface protrusion 16 including the constriction 16c having the smallest angle θ in the predetermined length Lz of the joint boundary 46 in each of the photographs was calculated to obtain an average. The results are shown in Table 4.

<Sample Nos. 31 and 32>

In Sample Nos. 31 and 32, except for changing the ratio (Dw/Dn) of the average particle size (Dw) of large oxide particles to the average particle size (Dn) of small oxide particles, as with Sample No. 1, capacitor samples were obtained, and the "calculation of an average of Tw/Tn of the interface protrusion 16 including the constriction 16c having the largest Tw in a predetermined length Lz (100 µm) of the joint boundary 46 in the Z-axis direction", the "calculation of an average of an angle θ of the interface protrusion 16 including the constriction 16c having the smallest angle θ in a predetermined length Lz (100 µm) of the joint boundary 46 in the Z-axis direction", and a liquid-tank-type thermal shock test were performed. The results are shown in Table 4.

TABLE 4

| Sample No. | Ratio Dw/Dn of Average Particle Size (Dw) of Large Oxide Particles to Average Particle Size (Dn) of Small Oxide Particles | Tw/Tn of Interface Protrusion Having Largest Tw in Length of 100 µm of External Electrode in Z-axis Direction | Angle θ of Smallest Construction Length of 100 µm of External Electrode in Z-axis Direction | Lquid-tank-type Thermal Shock Test |
|---|---|---|---|---|
| 31 | 3.1 | 3.22 | 29° | 0/80 |
| 1 | 2.8 | 2.66 | 118° | 0/80 |
| 32 | 1.7 | 1.95 | 137° | 2/80 |

According to Table 4, when a predetermined Tw/Tn was 2.66 or more (Sample Nos. 1 and 31), the results of the liquid-tank-type thermal shock test were more favorable than those when Tw/Tn was 1.95 (Sample No. 32). Thus, when a predetermined Tw/Tn was 2.66 or more (Sample Nos. 1 and 31), the joint reliability was considered to be higher than that when Tw/Tn was 1.95 (Sample No. 32).

According to Table 4, when a predetermined angle θ was 108° or less (Sample Nos. 1 and 31), the results of the liquid-tank-type thermal shock test were more favorable than those when the angle θ was 117° (Sample No. 32). Thus, when a predetermined angle θ was 108° or less (Sample Nos. 1 and 31), the joint reliability was considered to be higher than that when the angle θ was 117° (Sample No. 32).

Experiment 5

In Sample No. 41, except that the composition of the main component of the dielectric layers 10 was as shown in Table 5, as with Sample No. 1, capacitor samples were obtained, and an air-tank-type thermal shock test was performed. The results are shown in Table 5.

In Sample No. 41, the presence of interface protrusions 16 each having a constriction 16c on the surfaces of the external electrodes 6 on the dielectric layers 10 side was confirmed by the SEM observation and the elemental analysis by EPMA.

TABLE 5

| Sample No. | Composition of Main Component of Dielectric Layers | Air-tank-type Thermal Shock Test |
|---|---|---|
| 1 | $BaTiO_3$ | 0/80 |
| 41 | $(Ca_{0.7}Sr_{0.3})(Ti_{0.04}Zr_{0.96})O_3$ | 0/80 |

According to Table 5, even when the composition of the main component of the dielectric layers 10 was $(Ca_{0.7}Sr_{0.3})(Ti_{0.04}Zr_{0.96})O_3$ (Sample No. 41), the results of the air-tank-type thermal shock test were favorable. Thus, even when the composition of the main component of the dielectric layers 10 was $(Ca_{0.7}Sr_{0.3})(Ti_{0.04}Zr_{0.96})O_3$ (Sample No. 41), a high joint reliability was considered to be obtained.

Experiment 6

In Sample Nos. 51-53, except that the composition of large oxide particles and small oxide particles was as shown in Table 6, as with Sample No. 1, capacitor samples were obtained, and an air-tank-type thermal shock test was performed. The results are shown in Table 6.

In Sample Nos. 51-53, the obtained capacitor sample was cut in parallel to the X-Z plane, and the obtained cross section was subjected to mirror polishing and then photographed by SEM. An elemental analysis by EPMA was carried out. As a result, it was confirmed that interface protrusions 16 each having a constriction 16c were present on the surfaces of the external electrodes 6 on the dielectric layers 10 side. It was also confirmed that the elemental composition of the small oxide particles and the large oxide particles and the elemental composition of the interface protrusions 16 each having a constriction 16c were substantially the same.

TABLE 6

| Sample No. | Composition of Interface Protrusion | Air-tank-type Thermal Shock Test |
|---|---|---|
| 1 | $B_2O_3$—$SiO_2$—ZnO | 0/80 |
| 51 | $B_2O_3$—$SiO_2$ | 0/80 |
| 52 | $B_2O_3$—ZnO | 0/80 |
| 53 | $SiO_2$—ZnO | 0/80 |

According to Table 6, when the interface protrusions 16 each having a constriction 16c contained at least two selected from B, Si, and Zn as main components (Sample Nos. 1 and 51-53), the results of the air-tank-type thermal shock test were favorable. Thus, when the interface protrusions 16 each having a constriction 16c contained at least two selected from B, Si, and Zn as main components (Sample Nos. 1 and 51-53), a high joint reliability was considered to be obtained.

DESCRIPTION OF THE REFERENCE NUMERICAL

2 ... multilayer ceramic capacitor (capacitor sample)
4 ... element body
6 ... external electrode
   61 ... conductor
      61a ... between-narrow-part region
   62 ... non-metal component
10 ... dielectric layer (ceramic layer)
12 ... internal electrode layer
14 ... boundary layer
16, 160, 161, 162 ... interface protrusion
   16a, 161a, 162a ... narrow part
      16aL ... tangent line of narrow part
   16b, 161b, 162b ... wide part
      16bL ... tangent line of wide part
   16c ... constriction

What is claimed is:

1. A ceramic electronic device comprising:
an element body formed by laminating a ceramic layer and an internal electrode layer; and
an external electrode electrically connected to at least one end of the internal electrode layer,
wherein
at least a part of a joint boundary between the external electrode and the ceramic layer includes an interface protrusion protruding toward the external electrode,
the interface protrusion comprises an oxide, and
the interface protrusion includes at least two of B, Si, and Zn as main components.

2. The ceramic electronic device according to claim 1, wherein the external electrode includes at least one of Cu, Cu alloys, Ag, and Ag alloys as a main component.

3. The ceramic electronic device according to claim 1, wherein the interface protrusion includes:
a narrow part having a small width; and
a wide part having a larger width than the narrow part and disposed next to the narrow part extending to the inner side of the external electrode from the narrow part.

4. The ceramic electronic device according to claim 3, wherein two or more interface protrusions each having a constriction formed by the narrow part and the wide part are present in a length of 100 μm of the joint boundary between the element body and the external electrode.

5. The ceramic electronic device according to claim 3, wherein $20° \leq \theta \leq 140°$ is satisfied, where $\theta$ is an angle of a constriction formed by a tangent line of the narrow part and a tangent line of the wide part.

6. The ceramic electronic device according to claim 3, wherein Tw/Tn of the interface protrusion is 2 or more, where Tn is a width of the narrow part, and Tw is a width of the wide part.

7. The ceramic electronic device according to claim 1, wherein at least a part of the oxide is glass.

8. The ceramic electronic device according to claim 1, wherein the ceramic layer comprises a perovskite compound represented by $ABO_3$ as a main component.

9. The ceramic electronic device according to claim 8, wherein the perovskite compound represented by $ABO_3$ is represented by $(Ba_{1-a-b}Sr_aCa_b)_m(Ti_{1-c-d}Zr_cHf_d)O_3$ and satisfies $0.94<m<1.1$, $0 \leq a \leq 1$, $0 \leq b \leq 1$, $0 \leq c \leq 1$, and $0 \leq d \leq 1$.

10. The ceramic electronic device according to claim 1, wherein a magnitude correlation between $\alpha$, $\beta$, and $\delta$ satisfies $\beta > \alpha > \delta$, where $\alpha$ is a linear expansion coefficient of the ceramic layer, $\beta$ is a linear expansion coefficient of the external electrode, and $\delta$ is a linear expansion coefficient of the interface protrusion.

* * * * *